Jan. 14, 1964     A. M. CHREITZBERG     3,118,100
ELECTRIC BATTERY AND METHOD FOR OPERATING SAME
Filed Jan. 2, 1963
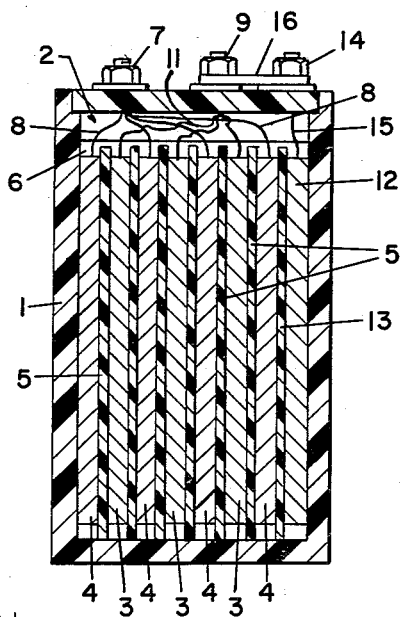
Fig. 1
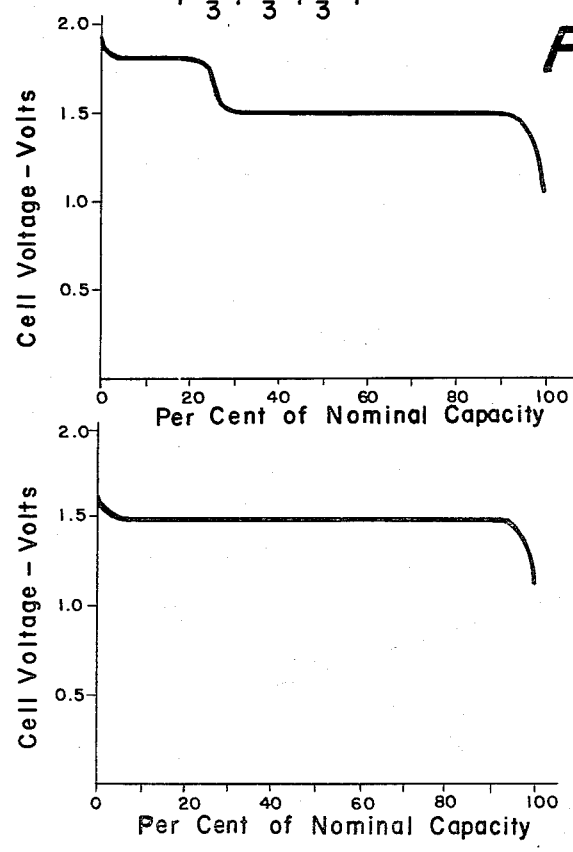
Fig. 2
Fig. 3

3,118,100
ELECTRIC BATTERY AND METHOD FOR
OPERATING SAME
Augustus M. Chreitzberg, Raleigh, N.C., assignor to The Electric Storage Battery Company, a corporation of New Jersey
Filed Jan. 2, 1963, Ser. No. 248,985
6 Claims. (Cl. 320—13)

The present invention generally relates to electric batteries. More specifically, the present invention is concerned with batteries of the silver-zinc type and to a method for operating the same.

Silver-zinc batteries have gained wide acceptance for many applications because they are characterized by a high power output per unit weight and unit volume. Silver-zinc batteries, however, have the disadvantage that at low rates they provide a two-step voltage discharge which results from the fact that the active materials of the silver electrode are both divalent silver oxide (AgO) and monovalent silver oxide ($Ag_2O$). For certain applications this two-step discharge cannot be tolerated and it is accordingly a specific object of the present invention to provide means for eliminating this two-step voltage discharge characteristic.

The electrode potential of divalent silver oxide is 500 millivolts vs. a mercuric oxide reference electrode. The electrode potential of monovalent silver oxide is 200 millivolts vs. a mercuric oxide reference electrode. In order to derive the maximum capacity from a silver-zinc battery it is necessary that the capacity available from the divalent silver-oxide be utilized. It is another object of the present invention to provide a means for utilizing this capacity while eliminating the two-step voltage discharge characteristic.

It is a further object of the present invention to utilize the divalent silver-oxide capacity of a silver-zinc battery to charge uncharged silver capacity within the battery to the monovalent silver oxide state.

In accordance with the present invention one or more additional positive electrodes are assembled in a silver-zinc cell in such a manner that the additional positive electrodes are electrically isolated from the principal positive and negative electrodes comprising the cell element. The additional positive electrodes are connected to an additional positive terminal which can be electrically isolated from the principal positive terminal during the charging of the cell. Means are provided for connecting the additional positive terminal to the principal positive terminal by means of a shorting strap of nominal resistance. In operation, the cell is charged to its nominal cut-off with the additional positive terminal isolated electrically from the charging circuit. To reduce the initial voltage plateau provided by the divalent silver-oxide capacity of the cell the additional positive terminal is then electrically connected to the principal positive terminal through the shorting strap. In this manner, divalent silver oxide capacity of the cell is utilized to charge the silver in the additional positive electrode or electrodes to the monovalent silver state. By adjusting the quality of silver in the additional plate or plates the degree of the voltage decrease can be tailored to suit the particular cell requirements. No capacity will be lost from the cell and all the electrodes including the additional positive electrode or electrodes are then discharged to a common end voltage. On succeeding cycles the shorting strap may be removed and the cell again charged to its cut-off voltage. The shorting strap may then be replaced and the divalent silver capacity again utilized to charge the additional positive electrode or electrodes to eliminate the divalent silver oxide plateau and the entire cell discharged to the cut-off voltage. The cut-off voltage should be in the range of 0.0 to 1.0 volt per cell.

The resistance to the shorting strap is chosen so as to make the exchange of the ampere hours capacity from the principal positive electrodes to the additional electrode or electrodes an efficient process involving a large portion of the area of the principal positive electrodes.

A better understanding of the present invention may be had from the following description when read with reference to the accompanying drawings of which:

FIG. 1 is a side elevation taken in section of a silver-zinc cell in accordance with the present invention;

FIG. 2 is a diagram showing the low rate voltage discharge characteristics of a typical silver-zinc cell; and FIG. 3 is a diagram illustrating a low rate voltage discharge of a silver-zinc cell in accordance with the present invention with the divalent silver oxide plateau eliminated.

Referring now to FIG. 1, the numeral 1 designates a cell container housing a conventional silver-zinc cell element 2 comprising positive electrodes 3, negative electrodes 4 and interleaved separators 5 in an alkaline electrolyte 6. The composition of the electrodes 3 and 4, the separators 5 and the electrolyte 6 in and of themselves form no part of the present invention and are to be considered the conventional components of a silver-zinc cell. Accordingly, the positive electrodes 3 comprise silver active material, the negative electrodes 4 comprise zinc active material, the separators 5 can be of a cellulosic material, and the alkaline electrolyte 6 may be an aqueous solution of potassium hydroxide or sodium hydroxide. As shown, each of the negative electrodes 4 of the cell element 2 is connected to the negative terminal 7 of the cell by means of the conductors 8. Similarly, each of the positive electrodes 3 of the cell element 2 is connected to the principal positive terminal 9 of the cell by means of the conductors 11.

In accordance with the present invention, there is also included within the cell container 1 in addition to the cell element 2 just described, at least one additional positive electrode 12 isolated from the electrodes of the cell element 2 by means of an additional separator 13. The additional positive electrode 12 is connected to an additional positive terminal 14 by means of a conductor 15. While one additional positive electrode 12 has been shown it should be understood that more than one additional positive electrode may be utilized within a cell and that such additional electrodes would also be electrically isolated from the electrodes of the cell element 2 and electrically connected to the additional positive terminal 14. As will be explained in more detail hereinafter, the additional positive terminal 14 is adapted to be connected to the principal positive terminal 9 by means of a connecting strap 16 which is shown in the drawing in a position connecting the positive terminals 9 and 14 together. The connector 16 is of nominal resistance, which for practical applications will have a resistance of between 0 and 20 ohms.

In operation the cell element 2 of the battery shown in FIG. 1 is charged to a nominal cut-off voltage of between 1.95 and 1.98 volts with the additional positive terminal 14 isolated electrically from the principal positive terminal 9. The voltage of the cell upon full charge will then be 1.84 to 1.88 volts on open circuit and if discharged in the conventional manner at a low rate would have a voltage discharge characteristic as shown in FIG. 2. In accordance with the present invention, the first voltage plateau attributable to the divalent silver oxide capacity of the cell is eliminated by utilizing a portion of this capacity to charge the uncharged silver in the additional positive electrode 12 to the monovalent silver oxide state. This is accomplished by connecting the additional positive terminal 14 to the principal positive terminal 9 by means of the connecting strap 16. The electrochemical reaction between the divalent silver oxide on the surface of the charged positive electrodes 3 and the silver in the additional positive electrode 12 will reduce the high voltage attributable to the surface divalent silver oxide sites to the lower monovalent silver oxide voltage, while raising the silver in the additional positive electrode 12 to the monovalent silvert oxide state. By adjusting the quantity of silver in the additional positive electrode 12 the degree of voltage decrease can be tailored to suit the requirements of the cell. In practice, it has been found that the extra capacity of the additional positive electrode 12 should not be more than 5% of the silver capacity of the primary cell element.

The resistance of the connecting strap 16 is chosen primarily to control the area of the principal positive plates to be reduced. The terminals 9 and 14 may be shorted together but the effect on voltage will be less reproducible; for most applications, even with sealed cells, this resistance would not exceed 20 ohms. As will be appreciated by those skilled in the art, by utilizing the additional positive electrode in accordance with the present invention to eliminate the divalent silver oxide plateau, a voltage characteristic such as is illustrated in FIG. 3 is obtained without a loss of capacity from the cell since the additional positive electrode 12 is discharged as an electrode of the cell element 2 by maintaining the connection between the additional positive terminal 14 and the primary positive terminal 9 during the discharge after the elimination of the higher voltage plateau. On subsequent cycles, the connecting strap 16 can be removed for charging of the cell element 2 and upon achieving by the cell of a full state of charge the connecting strap 16 may be replaced to charge the additional positive electrode 12 by again utilizing the divalent silver oxide capacity of the cell element 2 and the strap maintained in place for cell discharge.

While for the purposes of illustration, the cell of FIG. 1 has been shown as having one additional positive electrode electrically isolated from the electrodes of the cell element, it should be understood that for certain cell configurations, more than one additional positive electrode may be utilized. In addition, it is not necessary that the one or more additional positive electrodes utilized be located in the cell either at the outside of the element as shown or in line with the other electrodes. Thus, it is within the scope of the present invention that the one or more additional positive electrodes be distributed throughout the cell element, placed perpendicular to the cell element or otherwise dispersed in the cell container in a manner wherein they can be utilized as described to reduce all or a portion of the divalent silver oxide capacity of the element of the monovalent oxide plateau.

Having described the present invention, that which is claimed as new is:

1. A method of operating a cell having silver positive electrodes and zinc negative electrodes which comprises the steps of providing the cell with at least one additional silver electrode electrically isolated from the other electrodes of the cell, charging said cell to its divalent silver oxide capacity, connecting the additional positive electrode to the charged positive electrodes of said cell to cause said divalent silver oxide capacity of said cell to charge said additional positive electrode to monovalent silver oxide to discharge said divalent silver oxide capacity of said cell, said additional positive electrode being discharged as a positive electrode of said cell when said cell is discharged.

2. A method of eliminating the divalent silver oxide voltage plateau from the discharge characteristics of a cell having silver positive and zinc negative electrodes which comprises the steps of providing the cell with at least one additional silver positive electrode electrically isolated from the other electrodes of the cell, fully charging said cell to its divalent silver oxide capacity with said additional positive electrode electrically isolated from said other electrodes of said cell connecting said additional positive electrode to said other positive electrodes through a nominal resistance to cause said divalent silver oxide capacity of said other positive electrode to charge said additional silver positive electrode to monovalent silver oxide thereby discharging the surface portion of said divalent silver oxide capacity of said other positive electrodes, said additional positive electrode being discharged as a positive electrode of said cell when said cell is discharged.

3. A method of eliminating the divalent silver oxide voltage plateau from the discharge characteristics of a silver zinc cell having a principal positive terminal and a principal negative terminal which comprises the steps of providing the cell with at least one additional silver positive electrode electrically isolated from the other electrodes of the cell, said additional silver electrode being electrically connected to an additional positive terminal electrically isolated from the principal positive terminal of said cell, fully charging said cell to its divalent silver oxide capacity with said additional positive terminal electrically isolated from said principal positive terminal, connecting said additional positive terminal to said principal positive terminal through a nominal resistance to cause said divalent silver oxide capacity of said cell to charge said additional silver positive electrode to monovalent silver oxide thereby discharging said divalent silver oxide capacity of said cell, said additional positive electrode being discharged as a positive electrode of said cell when said cell is discharged.

4. A method of eliminating the divalent silver oxide voltage plateau from the discharge characteristics of a cell having silver electrodes connected to a principal positive terminal and zinc electrodes connected to a principal negative terminal which comprises the steps of providing the cell with at least one additional silver positive electrode electrically connected to an additional positive terminal electrically isolated from said principal positive terminal, charging said cell to its divalent silver oxide capacity with said additional positive terminal electrically isolated from said principal positive terminal, connecting said additional positive terminal to said principal positive terminal to cause said divalent silver oxide capacity of said cell to charge said additional silver positive electrode to monvalent silver oxide thereby discharging a portion of said divalent silver oxide capacity of said cell, said additional positive electrode being discharged as a positive electrode of said cell when said cell is discharged.

5. A silver-zinc cell comprising a cell container, a cell element in said container comprising silver positive electrodes and zinc negative electrodes spaced from each other by interleaved separators and an alkaline electrolyte, said cell container having a principal positive terminal and a negative terminal, said positive electrodes of said cell element being connected to said principal positive terminal, said negative electrodes of said cell element being connected to said negative terminal, an additional silver positive electrode in said container, said additional positive electrode being separated from said cell element by means of an additional separator and an additional positive terminal, said additional positive electrode being connected to said additional positive terminal.

6. In a silver-zinc cell having a cell element comprising silver positive electrodes and zinc negative electrodes spaced from each other by interleaved separators and an alkaline electrolyte, an additional silver positive electrode electrically isolated from said cell element, said additional positive electrode being adapted to be connected to the positive electrodes of said cell upon the charging of said cell to reduce the potential of the positive electrodes of said cell to their monvalent silver oxide potential by charging said additional positive electrode to the monovalent silver oxide state.

No references cited.